United States Patent
Steck, III

[11] Patent Number: 5,971,447
[45] Date of Patent: Oct. 26, 1999

[54] FISHERMAN'S KNOT TYING DEVICE

[76] Inventor: William F Steck, III, 98 Gun Club Rd., Stamford, Conn. 06903

[21] Appl. No.: 09/060,055

[22] Filed: Apr. 15, 1998

[51] Int. Cl.[6] .................................................. B65H 69/04
[52] U.S. Cl. .............................................................. 289/17
[58] Field of Search ............................... 289/17, 18.1, 2; 43/1, 4; 223/102; 66/116, 117; 401/6

[56] References Cited

U.S. PATENT DOCUMENTS

| | | | |
|---|---|---|---|
| D. 181,951 | 1/1958 | Young | D74/17 |
| 1,607,479 | 11/1926 | Raper | 223/102 |
| 2,117,143 | 5/1938 | Burger | 66/117 |
| 2,689,147 | 9/1954 | Smalley | 289/17 |
| 2,697,624 | 12/1954 | Thomas et al. | 289/17 |
| 2,758,858 | 8/1956 | Smith | 289/17 |
| 2,992,029 | 7/1961 | Russell | 289/17 |
| 3,086,802 | 4/1963 | Keeton | 289/17 |
| 3,106,417 | 10/1963 | Clow | 289/17 |
| 3,326,586 | 6/1967 | Frost et al. | 289/17 |
| 3,521,918 | 7/1970 | Hammond | 289/17 |
| 3,630,555 | 12/1971 | Newlin | 289/17 |
| 3,752,516 | 8/1973 | Mumma | 289/17 |
| 3,837,691 | 9/1974 | Smythe | 289/17 |
| 3,873,140 | 3/1975 | Bloch | 289/17 |
| 4,864,762 | 9/1989 | Cox | 289/17 |
| 5,197,217 | 3/1993 | Browning | 43/4 |
| 5,472,446 | 12/1995 | De La Torre | 289/17 |
| 5,562,684 | 10/1996 | Kammerer | 289/17 |
| 5,647,616 | 7/1997 | Hamilton | 289/17 |

*Primary Examiner*—Michael A. Neas

[57] ABSTRACT

A hand held knot tying device used for tying fishermen's knots, such as nail knots, which are used to tie monofilament segments to fishing line segments. The device has a straight portion that extends approximately one-half of its length at which point the other half tapers down to a diameter that is small relative to the straight portion. The grooves run the length of the straight portion but run out in the tapered portion due to the taper going below the depth of the grooves. To tie a knot with the device, the fisherman lays the fishing line in the widest groove, then, coming from the opposite direction, he lays the monofilament in one of the other grooves. Next, and having provided enough slack to do so, he wraps the monofilament back upon itself and the fly line, so as to form multiple coils, and then tunnels the free end of the monofilament back beneath the coils, using the third groove as a tunneling means. He then tightens the coils to form a knot around the straight portion. Next he slides the knot down the tapered portion. This loosens the knot, because the base around which it is wrapped becomes smaller as a direct result of going down the taper. Therefore, it is tightened again and slid further down the tapered portion until, ultimately, the knot is tightened around the extreme end of the device. Now the knot can be slid off the device, without danger of it coming undone due to overly large coils, and it is tightened for the last time. Finally, the free ends of the fishing line and monofilament are clipped short to complete the nail knot.

3 Claims, 5 Drawing Sheets

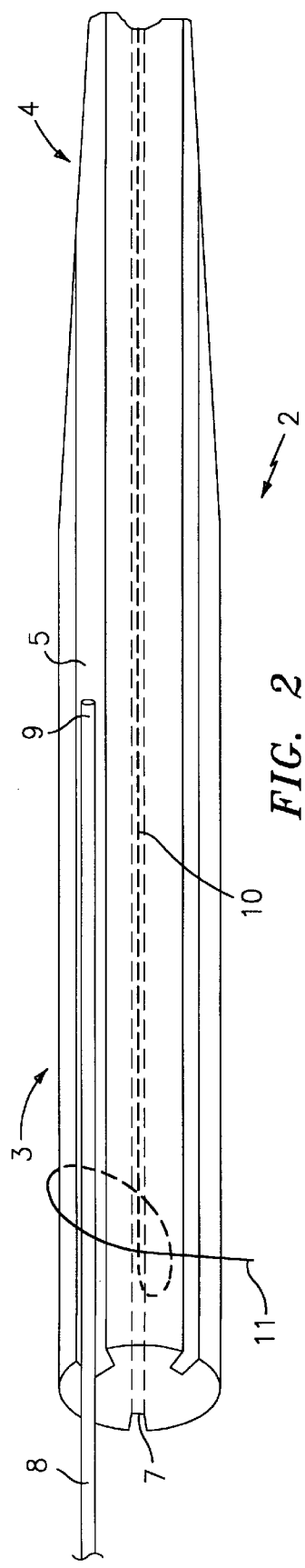
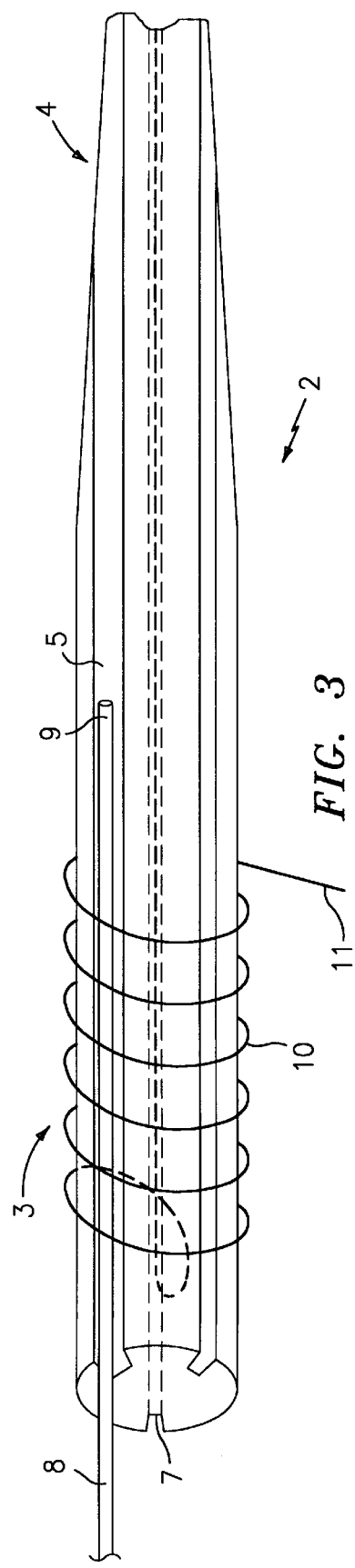
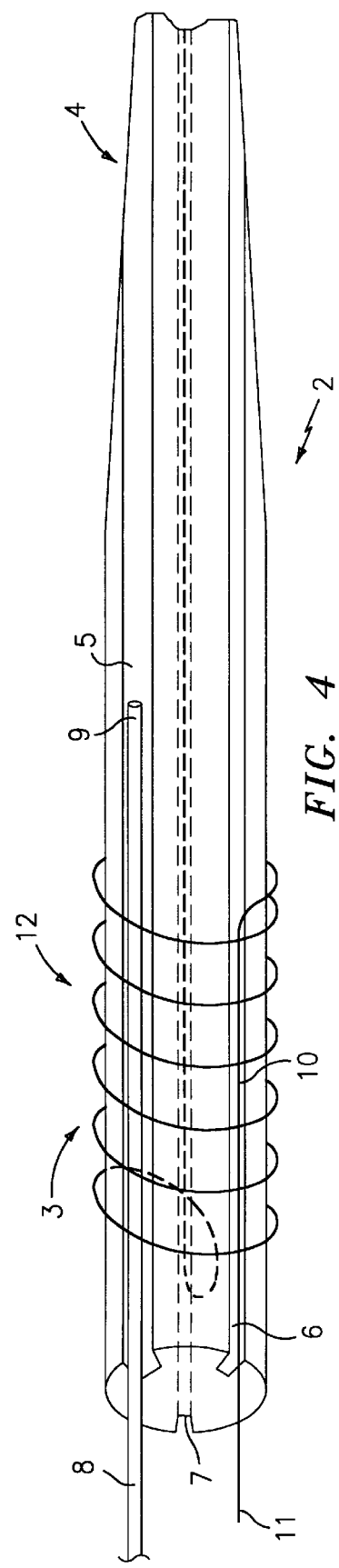

FISHERMAN'S KNOT TYING DEVICE

TECHNICAL FIELD

This invention is a device for tying knots such as the fisherman's Nail Knot. The nail knots is the most popular knot for connecting the butt end of fishing leader to fly line. It is also a popular knot for attaching monofilament to shooting line. The Nail Knot derived its name from the fact it was originally tied with the aid of a nail. It cannot be tied by hand alone. Some tool must be used to help tie it.

BACKGROUND ART

A fly fisherman must be equipped with a fishing rod, a fly line, a device such as a reel to hold the fly line, a leader, and lures. A leader is a relatively short, fine, tapered segment of monofilament line whose butt end is fastened to the end of the fly line. Lures, such as flies, are tied to the fine end of the leader.

Because the nail knot is difficult to tie, some manufacturers fabricate their fly lines with a loop on the end. This provides fishermen more latitude in choosing a knot for attaching leader to the fly line. For example, the common clinch knot, which is easy to tie, works well with a loop. However, a loop on the end of the fly line coupled with any knot is too bulky for many fishermen. For this reason many fishermen cut the loop off so they can use a nail knot to attach leader to their line.

The nail knot is trim and strong, appearing as small coils of leader tightly wrapped around the fly line. The tag ends of the fly line and the leader poke out of opposites sides of the leader coils and lay parallel to the fly line. They are clipped short so not to be obtrusive.

Nail Knot tying devices are presently for sale in the marketplace. They all have shortcomings. For example, a shortcoming of some devices, such as the "Fisherman's Needle 'N Tube", is that there is no mechanical means for holding the fly line and the leader together and parallel to each other while the coils are being wrapped around them. Hence, the leader, fly line, and tool must be simultaneously held in position with the fingers of one hand while the other hand wraps the coils. Another shortcoming exists with devices, such as the "Cinch Tie", wherewith the coils formed in the initial stages of the tying process are so much larger in diameter than the fly line, that it is difficult to keep them aligned after they are slid off the tool to be tightened around the fly line. Yet another shortcoming exists with tiers, such as the Fisherman's Needle 'N Tube' or the "3-N-1 Nail Knot Tool", which consist of two parts not physically connected. Hence, the parts become separated. Still another shortcoming exists with tiers, such as the "Cinch Tie", which are elaborate and costly to manufacture, thus necessitating a high price to the fisherman. And, finally, another shortcoming of some nail knot tying devices, such as the "3-IN-1 Nail Knot Tool", is that they tie only nail knots, or the equivalent. Thus, fishermen must employ their valuable vest space to carry a device that is devoted to only one knot.

It would be desirable to provide a knot-tying device which is easier to use and not prone to the difficulties described above.

BRIEF SUMMARY OF THE INVENTION

This invention is for a device that eliminates the shortcomings and drawbacks enumerated above. The device of this invention is a simple, one piece rod that is inexpensive to manufacture. It features three grooves that hold the fly line and leader together and parallel to each other during the knot tying process, thereby eliminating the difficult finger manipulations discussed above. The device has a tapered portion that is employed to reduce the size of knot coils to a manageable size prior to their being slid off the tool for final tightening. Further, the device of this invention ties many knots, including knots to tie fly line to leader, knots to tie two leader segments together, and knots to tie flies to leader. Thus the fisherman only need to carry one knot tying device in his vest.

These advantages will become apparent from the drawing herein and the detailed description of the preferred embodiment of this invention.

BRIEF DESCRIPTION OF THE DRAWINGS

FIGS. 2–6 illustrates the manner in which a leader and fly line are manipulated to form a nail knot.

DETAILED DESCRIPTION OF THE INVENTION

Figure 1:
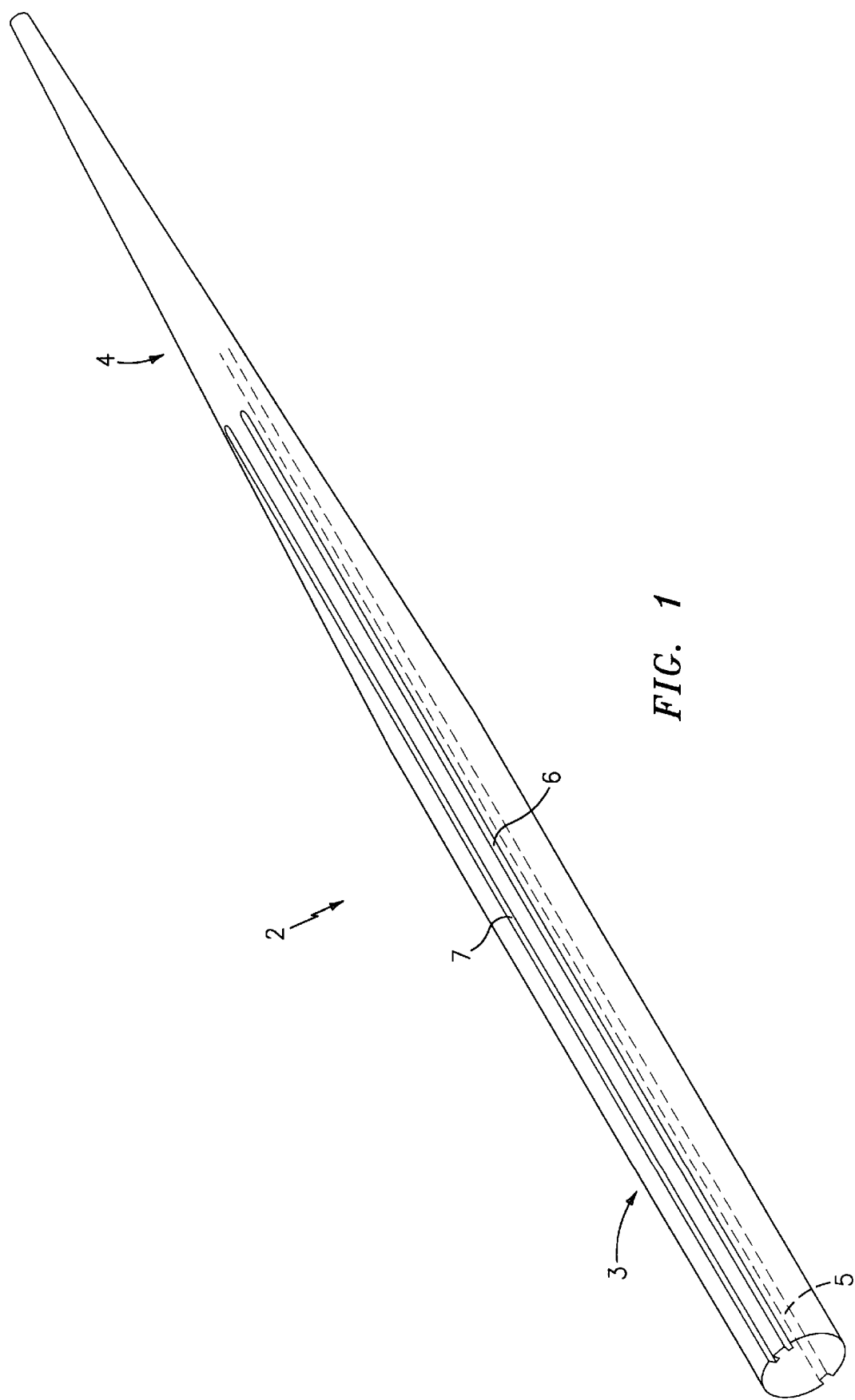
FIG. 1 is a perspective view of the preferred embodiment of a knot tying device made in accordance with this invention.

Referring now to FIG. 1, the preferred embodiment of this invention is shown. It is denoted generally by the numeral 2. The device 2 has a straight portion 3 and a tapered portion 4. Device 2 has grooves 5, 6, and 7 which are parallel to one another and to the axis of device 2. The grooves 5, 6, and 7 extend the entire length of straight portion 3, and continue into tapered portion 4 until they run out as the result the taper going below the depth of the grooves 5, 6, and 7. Grooves 6 and 7 are identical to each other. They are wide enough and deep enough to accommodate leader. Groove 5 has larger dimensions than grooves 6 and 7. It is wide enough and deep enough to accommodate fly line. Based on the simplicity of device 2, it can be surmised that will be inexpensive to manufacture, and will thus be available to fishermen at a good price.

Referring to FIG. 2, the first stage of the nail knot tying process is shown. Coming from the direction of straight portion 3, free end 9 of fly line 8 is laid inside groove 5. Then, coming from the direction of tapered portion 4, free end 11 of leader 10 is laid inside groove 7, so as to overlap free end 9 of fly line 8. The purpose of the overlap is to provide slack for the formation of leader coils later in the knot tying process.

Referring to FIG. 3, free end 11 of leader 10 is wrapped back upon leader 10 and fly line 8 to form neat coils. This step in the knot-tying process illustrates how the grooves of device 2 holds fly line 8 and leader 10 together and parallel to each other during the knot-tying process.

Referring to FIG. 4, free end 11 of leader 10 is tunneled back under the coils, using groove 6 as a tunneling means. This forms nail knot 12 in loose form.

Figure 5:
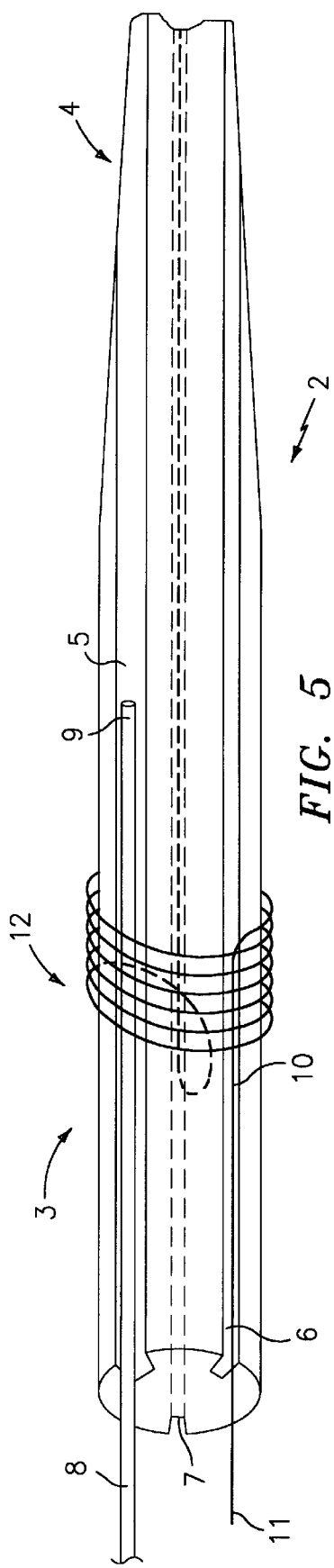

Referring to FIG. 5, nail knot 12 is shown tightened around straight portion 3 of device 2.

Figure 6:
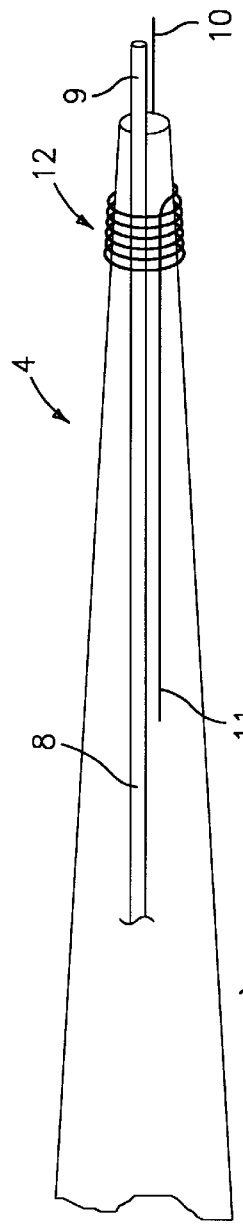

Referring to FIG. 6, the end of the following process is shown: Nail knot 12, following its being tightened around straight portion 3, as shown in FIG. 5, is slid down tapered portion 4. As nail knot 12 is slid down tapered portion 4, it loosens because the diameter of tapered portion 4 of device 2, around which knot 12 is formed, becomes smaller and smaller. Each time nail knot 12 loosens significantly, it is tightened again. Ultimately, nail knot 12 is tightened around the extreme end of tapered portion 4 of device 2, as shown. This step in the knot-tying process makes clear how tapered portion 4 allows the knot tier to significantly reduce the size of the coils, as initially formed, down to a diameter that is much closer to the diameter of fly line 8.

Figure 7:
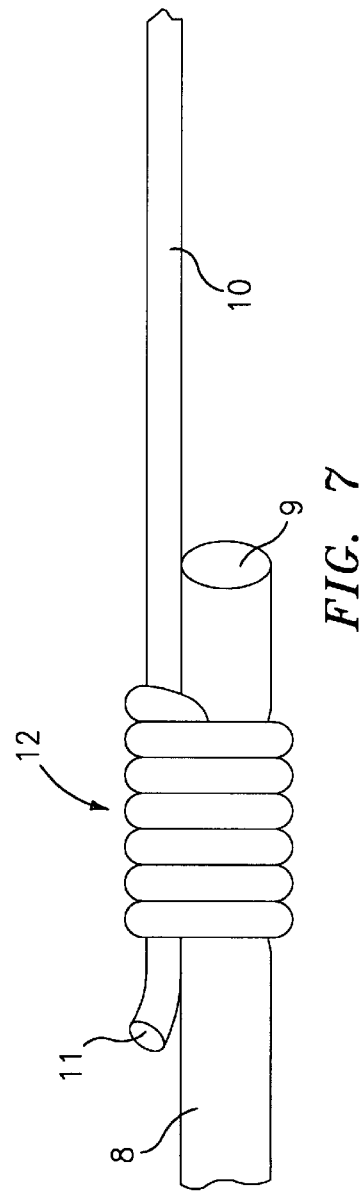
FIG. 7 depicts a completed nail knot as tied by the device of this invention.

Referring to FIG. 7, nail knot 12 has been manipulated to final form by sliding it off the end of device 2, tightening it for the last time, and clipping short free end 9 of fly line 8 and free end 11 of leader 10. The small diameter of the knot 12, before sliding off, keeps the coils intact and thus greatly facilitates this step.

In support of the assertion that the device of this invention can tie other valuable knots, the tying of the improved clinch knot and the improved blood knot are illustrated in FIGS. 8–11. The improved clinch knot is used to connect a hook to a leader. The improved blood knot is used to connect two leader segments. These knot are called improved because they are much stronger than the ordinary blood knot and ordinary clinch knot.

Figure 8:
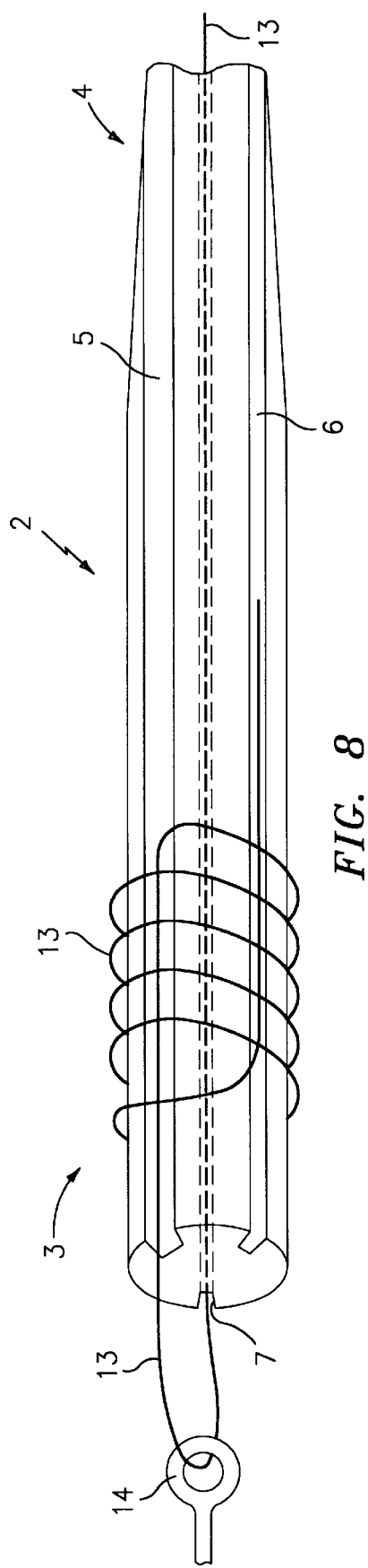
FIG. 8 depicts an improved clinch knot in an intermediate stage of completion.

Referring to FIG. 8, an improved clinch knot is shown in an intermediate stage of completion. It was formed as follows: Coming from tapered portion 4 of device 2, leader 13 was laid in groove 7, then put through the eye of hook 14, and then laid back in groove 5, going in the opposite direction. Leader 13 was then wrapped back upon itself to form neat coils, and tunneled back beneath the coils, using groove 6 as a tunneling means. This formed a loose, improved clinch knot, as shown.

Figure 9:
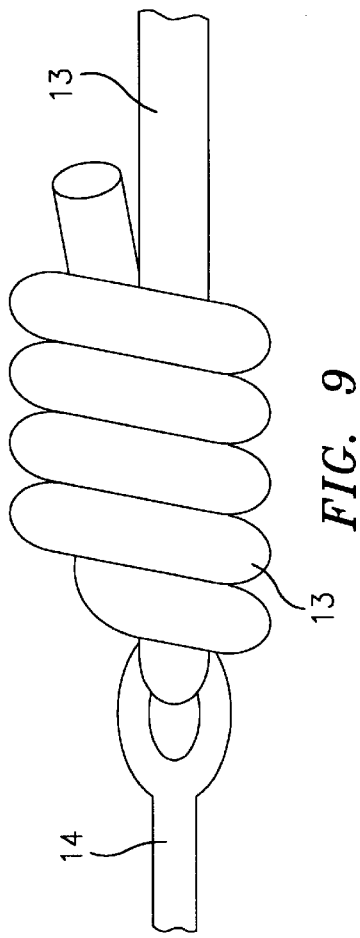
FIG. 9 depicts a completed improved clinch knot.

Referring to FIG. 9, an improved clinch knot is shown in final form. It was formed as follows: After completion of the steps described above, the loose improved clinch knot was tightened around straight portion 3 of device 2, slid down tapered portion 4, re-tightened two or three times along the way, and ultimately tightened around the extreme end of device 2. Next, the knot was slid off the end of device 2 and tightened for the last time. Then, being a slip knot, it was pulled up tight against the eye of hook 14. Finally, the free end of leader segment 13 was clipped short to form a completed improved clinch knot, as shown.

Figure 10:
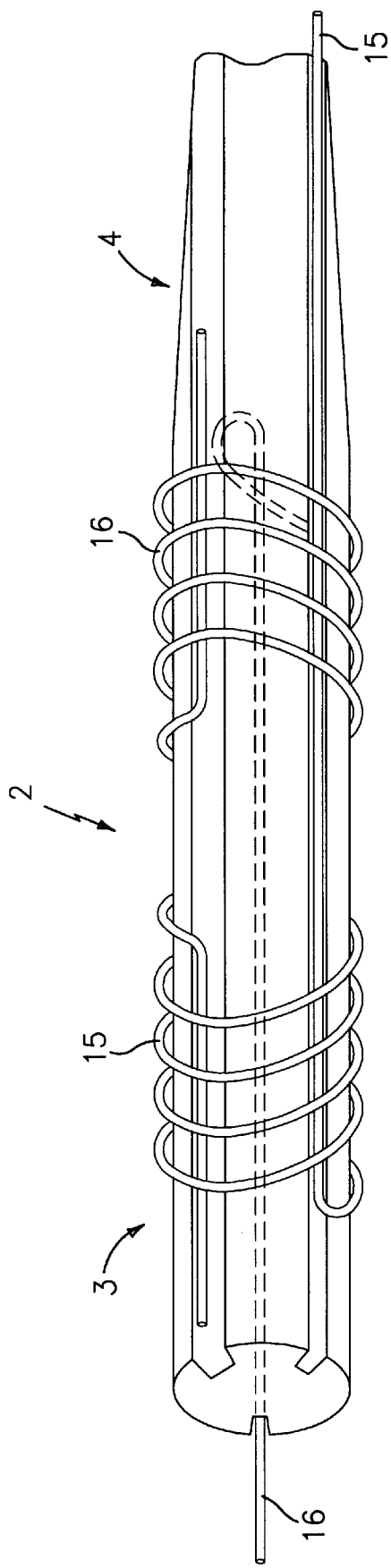
FIG. 10 depicts an improved blood knot in an intermediate stage of completion.

Referring now to FIG. 10, an improved blood knot is shown in an intermediate stage of completion. It was formed as follows: In the manner previously described for tying a nail knot, leader segment 15 was manipulated to form a nail knot around leader segment 16. Then, leader segment 16 was manipulated to form a nail knot around leader segment 15. This formed opposing loose nail knots as shown.

Figure 11:
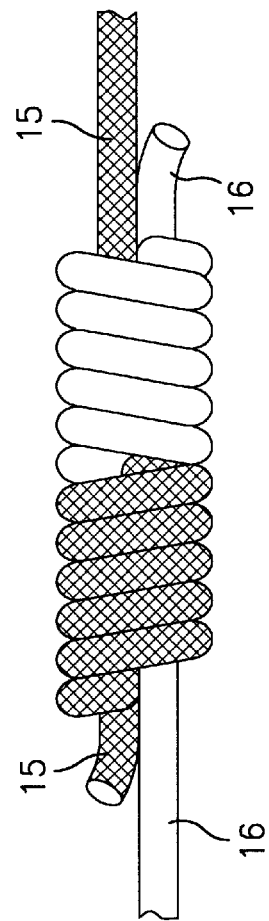
FIG. 11 depicts a completed improved blood knot.

Referring to FIG. 11, an improved blood knot is shown in final form. It was formed as follows: The opposing loose nail knots were individually tightened around straight portion 3 of device and then pulled together to form an improved blood knot. Then it was slid down tapered portion 4 of device 2, and re-tightened two or three times along the way until, ultimately, the improved blood knot was tightened around the extreme end of device 2, slid off device 2, and tightened for a final time. Finally, the free ends of leader segments 15 and 16 were clipped short to form a completed improved blood knot, as shown.

Since certain changes and variations of the disclosed embodiment of the invention may be changed without departing from the inventive concept, it is not intended to limit the invention other than as required by the appended claims. For example, in tying a nail knot, a single groove could be used to hold both the fly line and leader in position for tying a nail knot. Thus two groove would suffice rather than three. Further, the device need not be tapered, although that would eliminate the feature that keeps the coils intact during the tightening process. Still further, the device could be X shaped with each of the 4 vertexes being usable to hold line or leader. And still further, the device could be tapered on both ends without seriously hampering the tying of most knots.

What is claimed is:

1. A fisherman's knot tying device comprising: a solid rod comprising a cylindrical portion and a tapered frustoconical end portion, said rod including at least two longitudinally extending grooves therein, a first of said grooves being sized to receive a fly fishing line, and a second of said grooves being sized to receive a fly fishing leader, said grooves being circumferentially offset from each other on said rod; said cylindrical portion being operable to provide a mandrel about which a free end of a leader disposed in said second one of said grooves can be coiled about a line disposed in said first one of said grooves so as to form a slack knot between said leader and said line, and said tapered end portion providing a progressively diminishing surface upon which the slack knot can be progressively tightened as the device is disengaged from the leader and line.

2. The knot tying device of claim 1 wherein said grooves run out in said tapered end portion of said rod.

3. A fisherman's knot tying device comprising: a solid rod comprising a cylindrical portion and a tapered frustoconical end portion, said rod including a first longitudinally extending groove sized to receive a fly fishing line; a second longitudinally extending groove sized to receive a fly fishing leader; said grooves being circumfertially offset from each other on said rod; said cylindrical portion being operable to provide a mandrel about which a free end of said leader disposed in said second one of said grooves can be coiled about a line disposed in said first one of said grooves so as to form a slack knot between said leader and said line, and said tapered end portion providing a progressively diminishing surface upon which the slack knot can be progressively tightened as the device is disengaged from the leader and line; and a third groove in said rod, said third groove being operable to allow the free end of the leader to be slid underneath the slack knot in a direction on the device which is opposite to the tapered end portion of said device.

* * * * *